Patented Sept. 23, 1930

1,776,689

UNITED STATES PATENT OFFICE

HUGO REINHARD, OF OBERHAUSEN, GERMANY

TREATING WASTE AND LOW-GRADE PIGMENTS

No Drawing. Application filed September 8, 1928, Serial No. 304,836, and in Germany September 9, 1927.

This invention has reference to a method of manufacturing and treating mineral pigments by means of which the percentage of waste or inferior by-products may be reduced and the by-products in the course of manufacture may be converted into a state of high commercial utility. It is well known that in the manufacture of mineral pigments, particularly oxides or oxidic combinations of metals, the occurrence of a comparatively large percentage of inferior by-products, which are deficient in granulation purity, fluffiness or specific gravity, is unavoidable. In accordance with the previous art it has, for instance, been suggested in the case of oxidic pigments, such as oxide of zinc, to separate the inferior by-products in the wet way by treatment with water, salt solutions or the like, or by pneumatic means, but the results accomplished were highly unsatisfactory, inasmuch as the treated by-products never attained the degree of fine distribution, color, fluffiness and the other valuable properties of the unstained superior kinds of pigments obtained directly either by the burning of the metal with hot air or oxygen, or by a similar treatment of the respective metallic ores or by the indirect process of reduction, distillation or vaporization of the zinc and of equivalent metals with consequent combustion. Usually the low grade heavier and darker admixtures were not carried away by the blast by which the bright, unstained, impalpable portions of the oxidation products were driven off from the residue of raw material, and these heavier and darker admixtures would accumulate, with appreciable percentages of fine oxide, in the corners and recesses of the combustion and treating chambers as so-called drop-oxide or waste-oxide, and being comparatively too heavy to be carried away by the blast, they were deposited in the first sections of the chamber system, and their quality was in most cases further impaired by admixtures of the waste dust existing in the various enclosures of the plant.

In view of these difficulties encountered in the separation of the inferior grades of oxidic and similar pigments, which were increased in the case of the wet treatment by the necessity of drying the products, it has been usual to dispose of these inferior grades by mixing small quantities thereof with the regular production of the better grades of pigments.

Now my invention refers to a novel treatment of these waste products, drop oxides and the like, which broadly comprises treating them with the usual vehicles of paints and the like, such as oils, among which I may mention the various kinds of linseed oil and equivalent oils, stand-oil, refined, thickened and bleached poppy oil, fish oil, and other oils and varnishes usually employed as vehicles in the preparation of paints and the like. By means of this treatment the waste products become directly available, and in view of the very uniform dispersion of the waste products mentioned in such vehicles, as contradistinguished from their dispersion in aqueous liquids, the coarser particles may be readily separated from the more finely dispersed particles by stirring and more or less prolonged settling. Preferably this agitation with consequent separation of the coarser particles may be effected by the process of centrifuging, making use of the usual centrifugal separators. By this means it becomes possible to separate from the mixture of the pigments with oil in which the pigments are contained in suspension, the coarser and usually darker colored or discolored particles which may be employed in the manufacture of cheaper grades of paints and coatings, such as rust preventing paints and the like, while the finely dispersed portions, containing the finely disintegrated or powdered pigment suspended therewith in the larger proportion of the oil, are obtained separately and provide a stock base or composition which may be used directly for the manufacture of a high grade paint or varnish of good color and covering qualities.

According to a preferred manner of carrying out my new method of treatment I may proceed by first subjecting the inferior or waste products of the manufacture of pigments to screening and mechanical disintegration in any succession of steps, by which means the finest particles of the pigments, oxide of zinc, for instance, are first separated from the coarser particles and from deleterious admixtures before the treatment with oils and the like, so as to eliminate the lower grades of material and the foreign substances as much as possible. Thereupon the one or other class of material obtained by this separation may be submitted to the treatment with oils according to this invention, and they are thoroughly stirred up and mixed therewith, so as to cause the solids to be suspended in the oil in a highly dispersed state. The impurities and unoxidized metallic particles present as well as the darker portions of the oxidic products and foreign substances being generally coarser or heavier than the fine and more readily suspended portions of the oxide of zinc, it is possible by this means, and particularly by the aid of centrifuging, to eliminate the inferior particles and the impurities and foreign bodies from the mixture almost completely and without any appreciable loss of the finer portions of pigment. The separation may be carried on, so as to obtain different degrees of fineness of product, by altering the velocity of the centrifugal separator, but ordinarily it will be found sufficient to run the separator at a moderate speed. Usually the amount of oil necessary for the separation by differentiation of dispersion, or for the carrying on of the centrifuging method will be found to correspond to the amount required for the finished paint made from the finer portions of the material under treatment. In case the mixture should not possess the proper consistency, this may be adjusted by the addition of more pigment or more of the oil vehicle. By thus adjusting the consistency of the mixture the efficiency of separation in the different stages of agitation or centrifuging may also be increased. In order to arrive at a still greater differentiation and fineness of product, the residues of the several stages of agitation or centrifuging, particularly of the first stage, may be submitted over again to the agitating and centrifuging procedure after an addition thereto of the oil and, if necessary, after grinding of the residue one or more times in the oil contained therewith.

In case the residue remaining in some of the stages is of sufficient fineess, it may be used directly for the manufacture of paints or varnishes by grinding it up or otherwise mixing it with a suitable vehicle; or it may be previously ground alone or in admixture with oil until the required degree of fineness has been obtained.

Analysis of the raw material (drop oxide) shows:

Zn—77.60_____(calculated as ZnO: 96:61)
Pb _____ 0.135
Cd _____ 0.113
$SiO_2$ _____ 0.52
CaO _____ 0.084
$F_2O_3$ _____ 0.37
S _____ 0.073
$Al_2O_3$ _____ 0.12
Cu _____ 0.004

However, the 77.60% Zn contains up to 5% of metallic zinc, so that approximately only about 72% of the raw material in the form of Zn can be used for the manufacture of paint. Such 72% of Zn would be equivalent to about 91.16% ZnO. The first centrifugated product contains 97.80% ZnO. The second centrifugated product contains also 97.80% ZnO. The residues contain about 94.81% ZnO, including approximately 5% of metallic zinc contained in the raw material calculated as ZnO.

By proceeding in accordance with this invention it becomes possible to arrive at a much more differentiated and nicer and sharper separation of the different degrees of material contained in the off-products or by-products or drop-oxides than it is possible to produce by the old, ordinary process of screening and bolting, and there is the further advantage that the new process according to this invention may be conveniently combined with the usual methods of separation by screening, bolting and by pneumatic and similar means, and it becomes possible thereby to economically recover the by-products and to utilize the waste resulting in the manufacture of pigments and the like, and to convert such waste and off-product into material of high commercial value and utility, and there is practically no waste that cannot be utilized inasmuch as even the worst kinds of admixtures may be separated out and utilized as rust-preventing paint or for similar purposes.

The invention has been described herein in its broad features only, and it should be understood that it may be modified and be embodied in other exemplifications within the scope and spirit of the appended claim.

I claim:—

The process of recovering waste or low grade products resulting from the manufacture of zinc oxide and utilizing the same for the manufacture of oil, enamel or lacquer paints, which consists in mixing the waste product with an oil vehicle of suitable character and amount to produce the desired paint, and centrifuging the mixture so as to effect an elimination of the coarser solid particles and to leave the finer solid particles combined with the vehicle to produce a paint of desired consistency.

In testimony whereof I affix my signature.

HUGO REINHARD.